United States Patent [19]

Macovaz et al.

[11] Patent Number: 5,526,847
[45] Date of Patent: Jun. 18, 1996

[54] PIPES WITH INTEGRAL SOCKETS

[75] Inventors: George Macovaz; Peter G. Chapman, both of Sydney, Australia; Jyri Jarvenkyla, Hollola, Finland

[73] Assignees: Vinidex Tubemakers Pty. Limited; Upnor N.V., both of Australia

[21] Appl. No.: 400,121

[22] Filed: Mar. 6, 1995

Related U.S. Application Data

[63] Continuation of Ser. No. 809,503, filed as PCT/AU90/00265, Jun. 21, 1990 published as WO90/15949, Dec. 27, 1990, abandoned.

[30] Foreign Application Priority Data

Jun. 21, 1989 [AU] Australia .................... PJ4854

[51] Int. Cl.$^6$ ..................................... F16L 9/12
[52] U.S. Cl. ............... 138/109; 138/177; 264/532
[58] Field of Search ..................... 138/109, 177, 138/DIG. 11; 264/532, 531, 564, 537; 285/909

[56] References Cited

U.S. PATENT DOCUMENTS

| | | | |
|---|---|---|---|
| 3,594,864 | 7/1971 | Gilbert | 18/5 BE |
| 4,276,010 | 6/1981 | Shartzer | 425/143 |
| 4,362,187 | 12/1982 | Harris et al. | 138/109 |
| 4,363,619 | 12/1982 | Farrell | 264/537 |
| 4,447,199 | 5/1984 | Reed et al. | 264/564 |
| 4,499,045 | 2/1985 | Obsomer | 264/532 |
| 4,987,961 | 1/1991 | McNeely, Jr. | 138/109 |

FOREIGN PATENT DOCUMENTS

| | | |
|---|---|---|
| 0163336 | 12/1985 | European Pat. Off. |
| 1432539 | 4/1976 | United Kingdom. |
| 1589052 | 5/1981 | United Kingdom. |

OTHER PUBLICATIONS

Opposition lodged by Wavin B.V. corresponding to EPO Patent No. 0404557; May 23, 1995.
"Kunststoff-Extrudertechnik"; Von Dr.-Ing. Gerhard Schenkel; Carl Hanser Verlag Munchen; 1963; pp. 347–350.

*Primary Examiner*—David Scherbel
*Assistant Examiner*—Patrick F. Brinson
*Attorney, Agent, or Firm*—Hayes, Soloway, Hennessey, Grossman & Hage

[57] ABSTRACT

A circumferentially or biaxially oriented plastics pipe comprising a body with an integral socket at one end thereof. The socket has a wall of lesser axial draw than the body of the pipe.

8 Claims, 5 Drawing Sheets

PIPES WITH INTEGRAL SOCKETS

"This is a continuation of appliction(s) Ser. No. 07/809,503, filed as PCT/AU90/00265, Jun. 21, 1990 published as WO90/15949, Dec. 27, 1990, now abandoned and which designated the U.S."

FIELD OF THE INVENTION

This invention relates to pipes of plastics material having molecular orientation, and in particular to the manufacture of oriented plastics pipes with integrally formed sockets.

BACKGROUND OF THE INVENTION

It is well established that molecular orientation of plastics can provide enhanced mechanical, properties. Orientation is achieved by drawing or stretching the material under appropriate conditions of temperature. A number of methods have been proposed whereby this principle is applied to plastic pipes, in particular in order to enhance the burst strength under internal pressure by circumferential drawing.

United Kingdom Patent 1,382,580 describes the production of circumferentially oriented foamed PVC pipes by the expansion of a tubular feedstock in a cylindrical mould.

A difficulty arises in such methods in the provision, of a socket for the purpose of jointing of pipes together. Whilst there are many couplers and separate joining devices that might suffice for this purpose, the preferred system provides an integral enlarged bell on one end of the pipe, into which the other end or spigot may be inserted, with an appropriate sealing system, such as adhesive or rubber gasket. It is generally considered necessary that the socket section of such pipes should be strengthened in relation to the body, because of the increased diameter and hydrostatic stresses, and to cope with the variety of other loads to which the socket section may be subjected. A common procedure is to thicken the wall of the socket with respect to the wall of the pipe, proportionately to the diameters.

United Kingdom Patent 1,432,539 describes the production of an enlarged diameter socket portion by expansion of the feedstock into a female mould in such a way as to produce circumferential orientation. This method is unsatisfactory as a consequence of the reduced wall thickness of the socket portion, and subsequent patent applications by the same applicant have described alternative techniques. In Australian Patent Application 29086/77 the socket portion is formed from a portion with increased wall thickness, while in Australian Patent Application '29088/77 a sleeve is placed over the socket portion to counteract the loss of wall thickness.

The prior art proposals are cumbersome and not conducive to efficient manufacture. Feedstock thickening causes loss of dimensional control and requires exacting control of cutting of the extrusion to ensure correct positioning of the thickened section. Sleeving requires the production and fitting of the sleeve by a secondary process.

A further problem arises with oriented pipes if it is desired to provide fittings such as bend and tees with joints secured to the pipe to support axial thrust. Such devices can be utilised with un-oriented plastic pipes, as the axial strength of the pipe can accommodate the service loadings. For oriented pipes, axial strength should also desirably be increased by introducing axial orientation.

In the method described in U.S. Pat. No. 4,499,045, the method of U.K. 1,382,580 is modified by the use of a sleeve which moves progressively along the feedstock controlling its expansion. The friction between this sleeve and the feedstock produces longitudinal drawing of the tube, resulting in a biaxially oriented pipe. The method there described suffers from a lack of positive control over the degree of axial drawing of the feedstock, and offers no solution to the problem of providing a satisfactory socket by an economical process.

It is the purpose of the present invention to provide a method of manufacturing an oriented plastic pipe having on one end an integral socket with the necessary enhanced strength and wall thickness, without the need to pre-thicken the feedstock at the socket section. The invention is characterised by the use of controlled axial drawing of the feedstock, such that a differential axial draw ratio is applied to the socket and the body of the pipe to produce the desired relative thickness and properties.

SUMMARY OF THE INVENTION

The present invention provides a circumferentially or biaxially oriented plastics pipe comprising a body with an integral socket at one end thereof, with the socket having a wall of lesser axial draw than the body of the pipe. The invention also provides a method of forming such a pipe, comprising:

(a) heating a feedstock tube to a desired orientation temperature;

(b) forming a socket by circumferential drawing of a portion of the feedstock tube with a first degree of axial draw; and (c) forming the body of the pipe by circumferential drawing of the feedstock tube with a second degree of axial draw, wherein said first degree of axial draw is less than said second degree of axial draw.

DESCRIPTION OF THE PREFERRED EMBODIMENTS

As used hereix, the term "axial draw" refers to elongation relative to the length which would be achieved by free-end circumferential drawing. In free-end circumferential drawing, the ends of the feedstock are not axially restrained, and material is drawn from the length and wall thickness resulting in a pipe having the length and wall thickness reduced by a factor of which is substantially equal to the square root of the ratio increase in diameter. By contrast, in fixed-end circumferential drawing the length remains constant and the wall thickness is reduced by a factor equal to the increase in diameter. Thus, fixed-end drawing results in a thinner wall and positive axial draw compared to free-end drawing, with axial molecular orientation of the plastics material also resulting when the drawing is conducted at an appropriate orientation temperature.

In one form of the invention, the socket may have zero axial draw, whilst the socket body of the pipe has some positive axial draw. In another form, the socket may have some positive axial draw, while the body of the pipe has a larger positive draw ratio. In a further form the socket may have a negative axial draw or compression, whilst the body of the pipe some positive draw.

Figure 1:
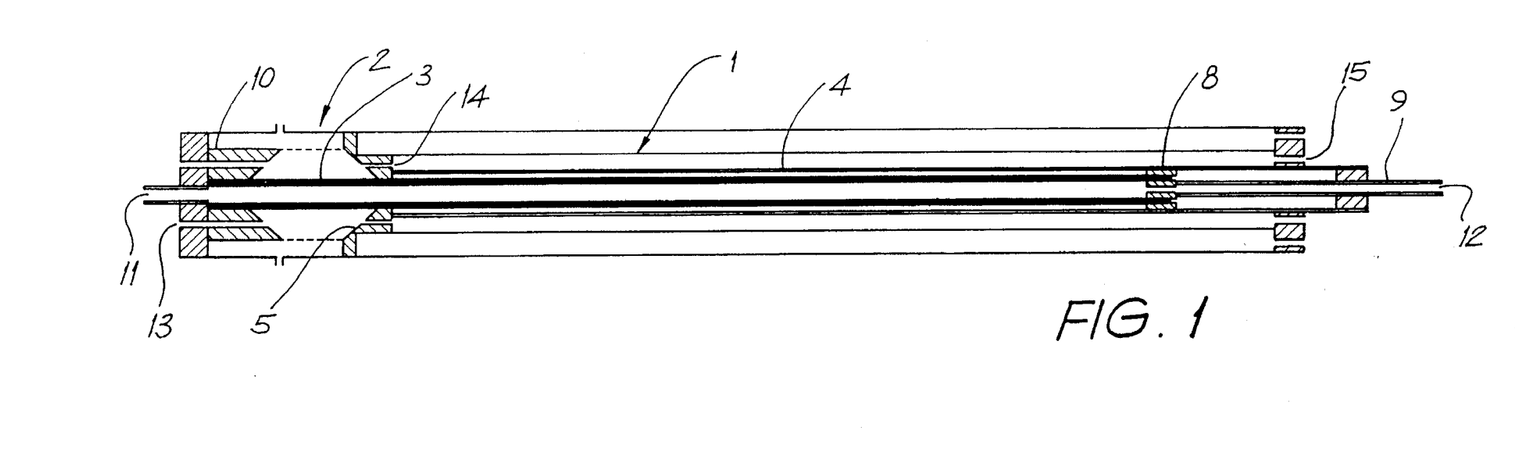
FIG. 1 shows a mold containing a plastics tube, for the preparation of an oriented plastic pipe in accordance with the present invention, prior to molding.
Figure 2:
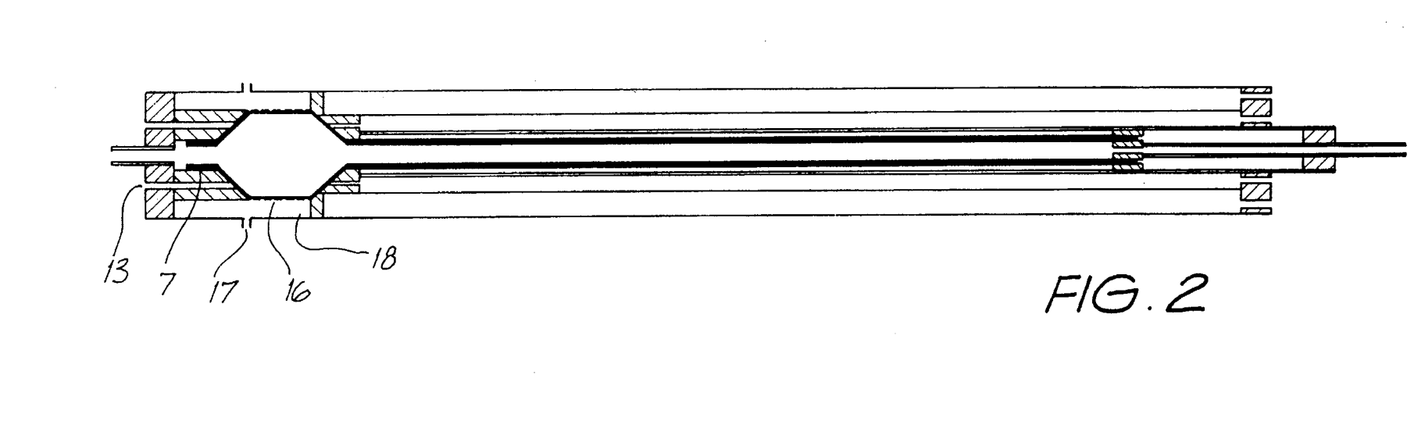
FIGS. 2–6 show the various stages of pipe manufacturing.

Preferably, the socket wall has circumferential orientation and the body has biaxial orientation. A process by which such differential axial draw combined with circumferential draw may be achieved is illustrated in FIG. 1. A mould 1 has internal diameter sensibly equal so the final external diameter desired for the finished pipe. The end or socket section 2 of the mould is shaped essentially to the external configuration desired for the socket of the pipe, optionally with a groove (not shown) for formation of a groove in the socket of the pipe to contain an elastomeric seal. The socket section is constructed such that it may be opened laterally or axially to enable removal of the finished pipe. As can be seen from FIGS. 1–6, a socket 21 can be prepared having a greater diameter than the body 22 of the finished pipe.

A feedstock tube 3, which may be preheated partly or fully to the desired orientation temperature, is supported and enclosed by a sleeve or other support device 4, and introduced into the mould. Affixed to the end of the sleeve is a conical flange 5, close fitting and able to slide within the mould. The sleeve is moved initially to position the flange adjacent to the back of the socket section 2 of the mould as in FIG. 1. The end of the feedstock is clamped in a chuck 8 attached to rod 9, by which means the feedstock is moved within the sleeve to engage in endcap 10 having a close fit around the external diameter of the feedstock.

Fluid at an appropriate temperature is circulated within and without the feedstock 3 via ports 11, 12, 13, 14, 15 to bring the feedstock to a consistent and uniform temperature required for properly controlled drawing of the material. The pressure applied to the fluid via port 11 is then increased to that required to effect drawing or stretching of the material, which expands into the socket section of the mould as in FIG. 2, expelling heating fluid via ports 13, 14, 16 and 17. During this process material is pulled from the endcap 10 and sleeve 4 without restraint, so that the material of the socket of the pipe is not drawn in the axial direction. Optionally, the end 7 of the feedstock may be gripped in a chuck and tension applied to the feedstock via chuck 8 and rod 9 to produce any desired degree of axial draw in the socket. Optionally again compression may be applied to the ends of the leadstock to produce negative draw and additional thickening of the socket.

Elastomeric seals, of self sealing or hydraulically actuated type, may be incorporated in the sleeve 4 and endcap 10 to aid in expansion of the socket.

Figure 3:
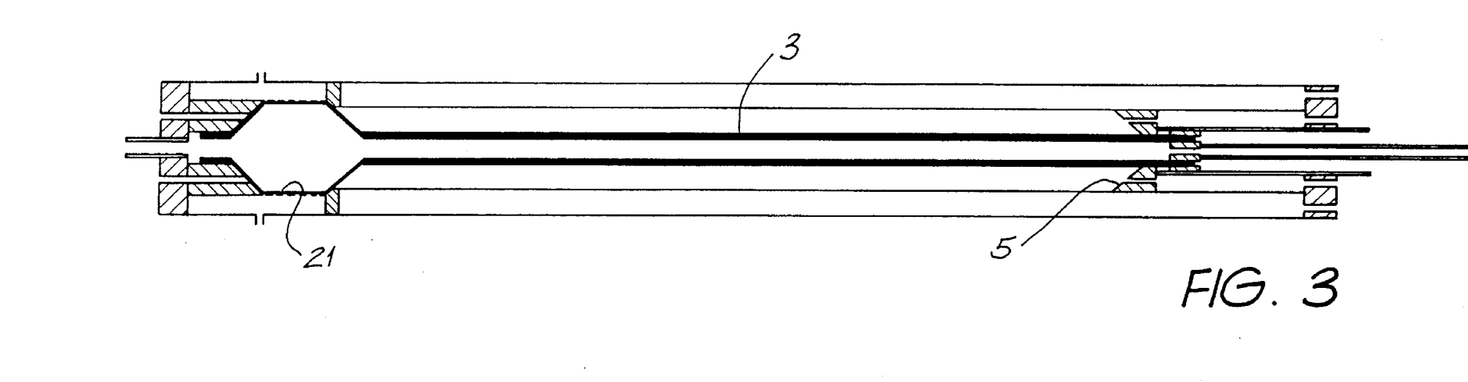
Figure 4:
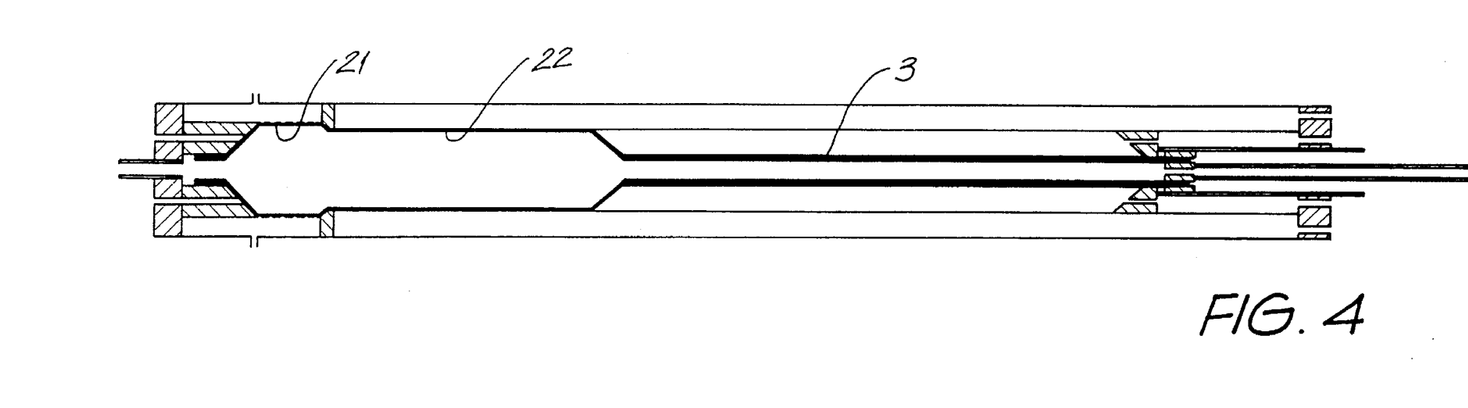

On completion of expansion of the socket cold fluid is introduced via port 17 to the cooling jacket 18 around the mould socket section to fix or freeze the oriented material of the pipe socket. The pressure within the feedstock is then reduced to allow relaxation of the feedstock body section within the sleeve. Sleeve 4 may be partially withdrawn during this process, or fully withdrawn as shown in FIG. 3. The pressure is then increased via port 11 to expand the body of the feedstock as shown in FIG. 4, such expansion commencing naturally from the already expanded socket section and moving towards the other end. The tension force applied to the feedstock via rod 9 by means of the chuck 8 prevents reduction in length of the feedstock during the circumferential expansion, thus resulting in a thinner wall and positive axial drawl Or completion of expansion of the pipe cold fluid is introduced via ports 11, 12 to fix the orientation, and the chucks then released and the mould opened at endcap 10 and socket section 2 to enable the pipe to be removed. The ends of the pipe are trimmed appropriately to form the finished product.

Figure 5:
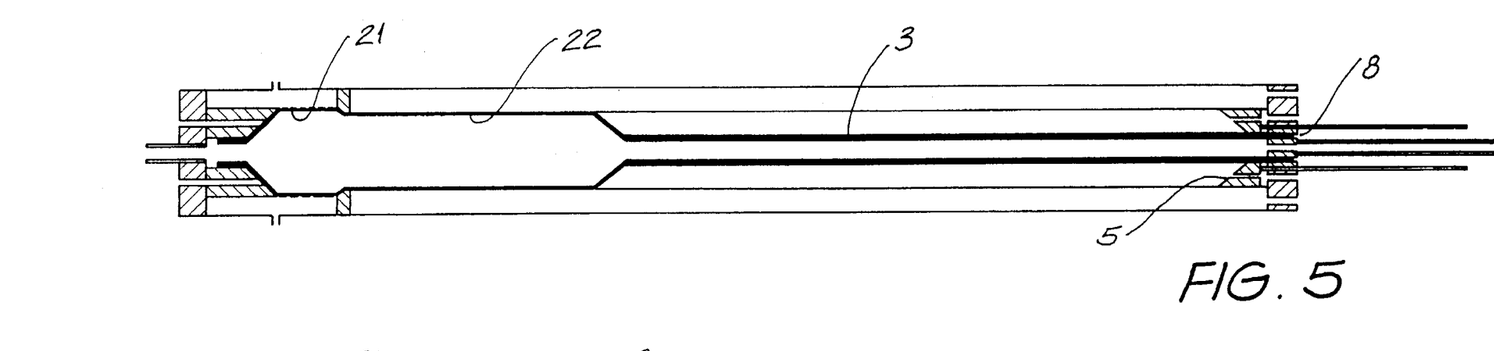

In one variation of the process, shown in FIG. 5, additional tension is applied to the feedstock by means of chuck 8 to give a desired amount of additional axial draw. This additional draw may be applied before or during the circumferential-expansion.

Figure 6:
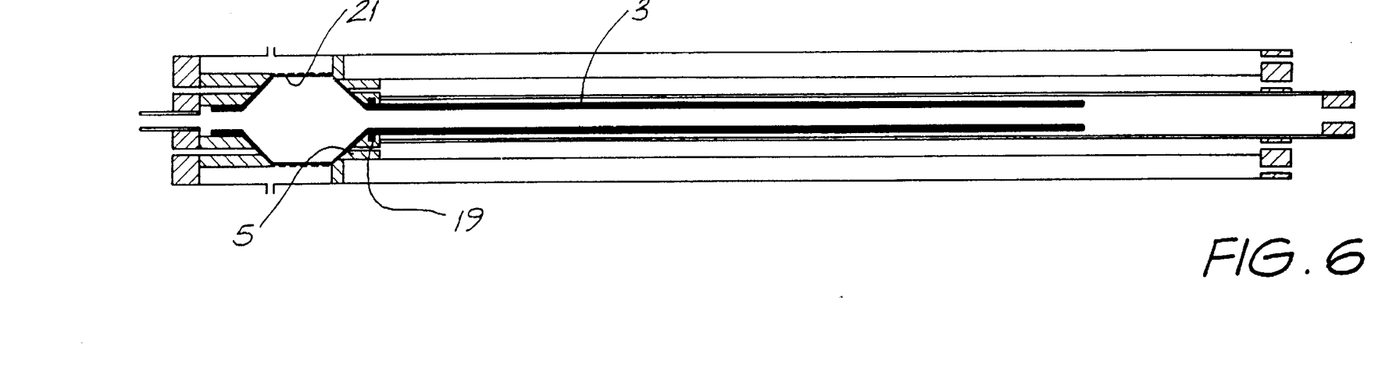
Figure 7:
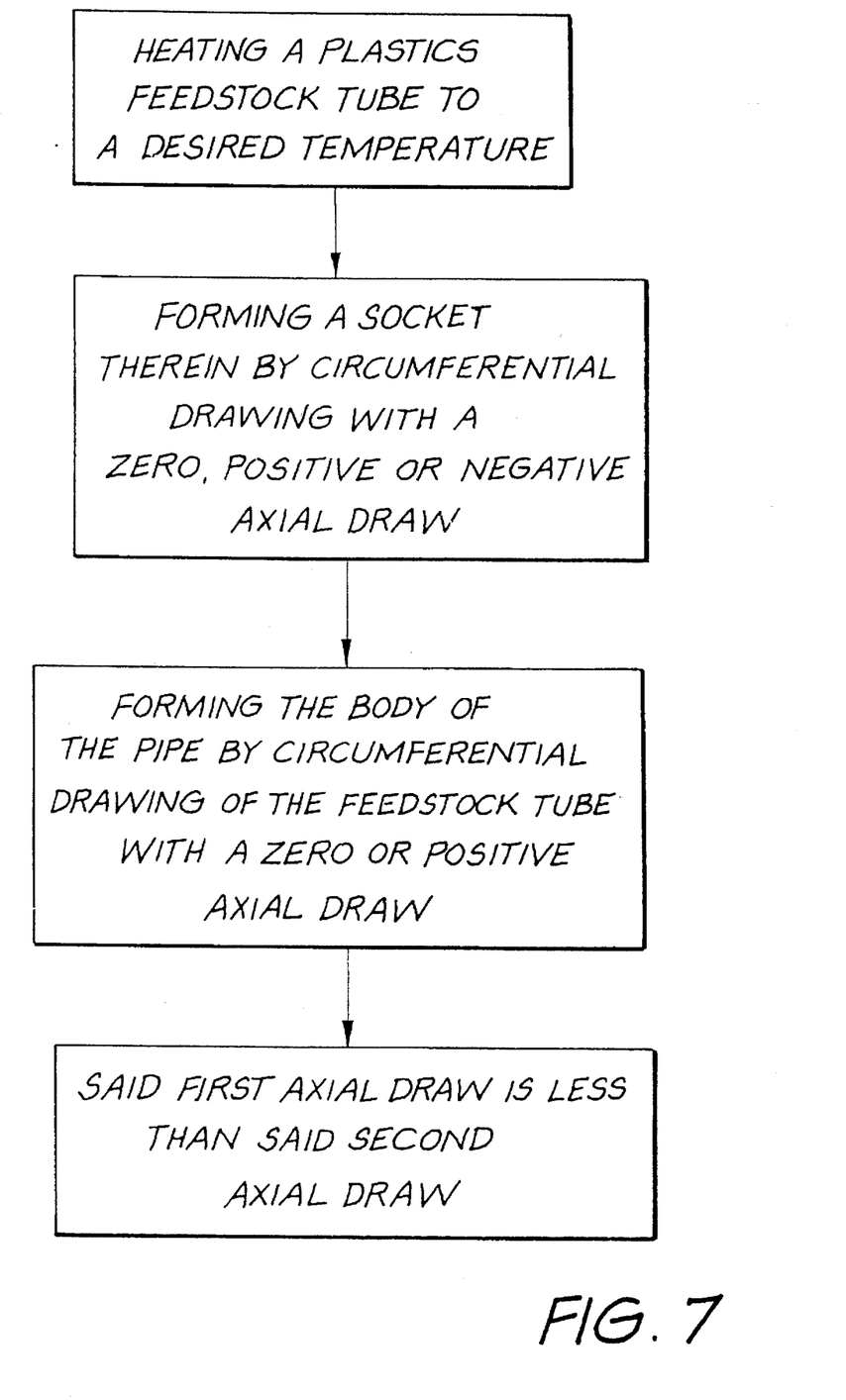
FIG. 7 describes the various axial draw conditions.

In another-variation of the process shown in FIG. 6, friction between the feedstock 3 and sleeve supporting device 4 equipped with a seal 19 may be used to effect and control axial draw in a manner similar to that described in the abovementioned U.S. Pat. No. 4,499,045, by maintaining pressure within the feedstock during withdrawal of the sleeve. In this procedure, also the rod 9 and chuck 8 may be eliminated, and movement of the sleeve 4 and flange 5 axially within the mould prior to or,during expansion of the socket may be used to obtain any desired axial draw of the socket.

Figure 8A:
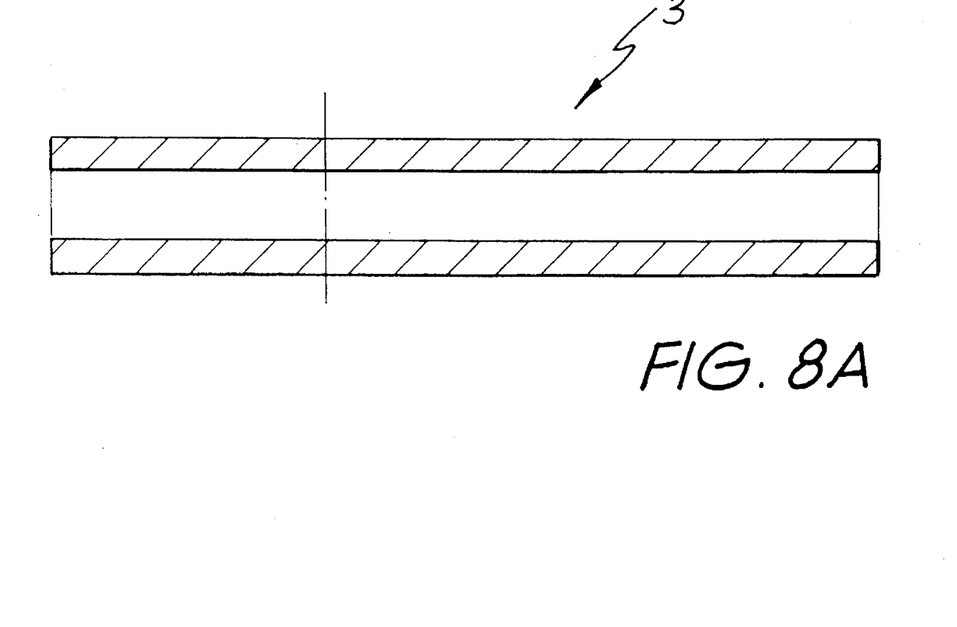
FIGS. 8A and 8B illustrate the change in thickness of a pipe section when subjected to axial and circumferential draw to form a pipe and integral socket according to the invention.
Figure 8B:
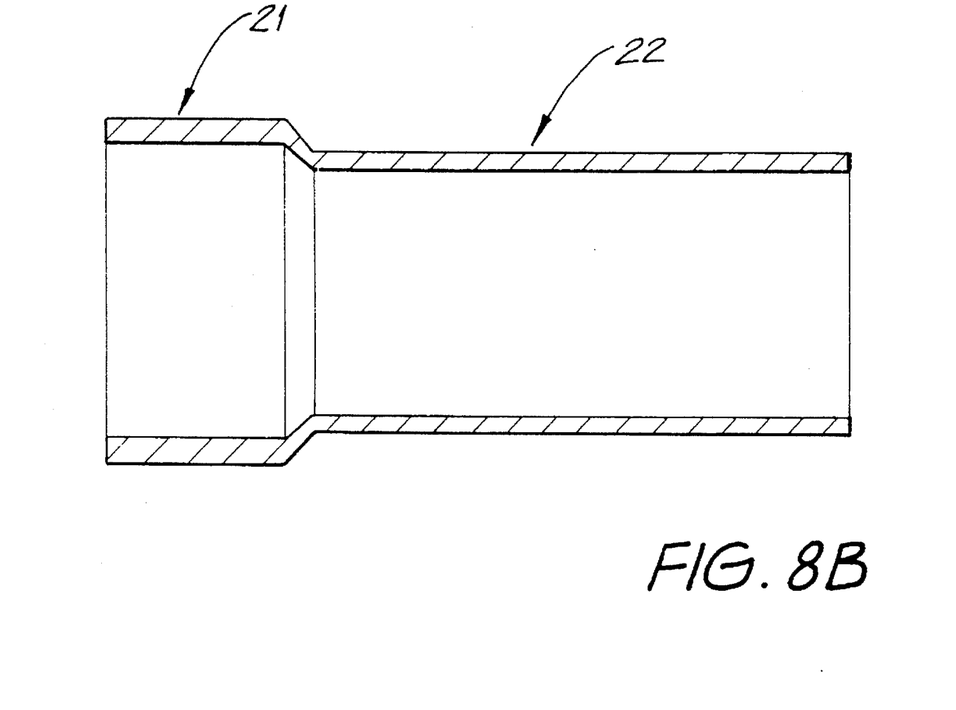

FIGS. 8A and 8B illustrate the change in wall thickness which occurs when a feedstock tube 3 is drawn with free-end drawing of the socket 21 (resulting in zero axial draw) and fixed end drawing of the body 22 (positive axial draw equal to the square root of the circumferential draw ratio).

FIG. 8A shows the feedstock 3, having a predetermined length and constant diameter and wall thickness. The dotted line indicates the portion which will form the back of the socket; the portion shown to the left of the dotted line will form the socket and the portion to the right will be formed into the body of the pipe.

FIG. 8B shows a socketed, biaxially oriented pipe according to the invention, formed from the feedstock tube of FIG. 8A. The socket 21 has been drawn circumferentially using free-end drawing, so that it has shortened in length by the square root of the increase in diameter. This equates to zero axial draw.

The body of the pipe has been drawn circumferentially by an amount somewhat less than the socket, so that the diameter of the body is smaller than the body by an amount sufficient for insertion of the socket-remote end 7 of the pipe into the socket of an identical pipe. The body is formed by fixed-end circumferential drawing, so that the length remains unchanged and the wall thickness is reduced by a factor equal to the increase in diameter. As a consequence, the wall thickness of the socket is greater than that of the body.

We claim:

1. A biaxially oriented plastics pipe comprising a body with an integral socket of greater diameter than the body at one end thereof, with the socket having a wall of less axial draw than the body of the pipe.

2. A pipe according to claim 1 wherein the socket wall has a greater degree of circumferential molecular orientation than the body of the pipe.

3. A pipe according to claim 1 wherein the socket wall has substantially zero axial draw and the body of the pipe has positive axial draw.

4. A pipe according to claim 3 wherein the socket wall has circumferential orientation and the body has biaxial orientation.

5. A biaxially oriented plastic pipe comprising a body with an integral socket of greater diameter than the body at one end thereof, with the socket having a wall of less axial draw than the body of the pipe so that the socket has a greater wall thickness than the body of the pipe.

6. A pipe according to claim 5 wherein the socket wall has a greater degree of circumferential molecular orientation than the body of the pipe.

7. A pipe according to claim 6 wherein the socket wall has substantially zero axial draw and the body of the pipe has positive axial draw.

8. A pipe according to claim 7 wherein the socket wall has circumferential orientation and the body has biaxial orientation.

* * * * *

UNITED STATES PATENT AND TRADEMARK OFFICE
CERTIFICATE OF CORRECTION

PATENT NO. : 5,526,847
DATED : June 18, 1996
INVENTOR(S) : MACOVAZ ET AL.

It is certified that error appears in the above-indentified patent and that said Letters Patent is hereby corrected as shown below:

Col. 2, line 53, "hereix" should read "herein".

Signed and Sealed this

Third Day of December, 1996

*Attest:*

BRUCE LEHMAN

*Attesting Officer*    Commissioner of Patents and Trademarks

UNITED STATES PATENT AND TRADEMARK OFFICE
CERTIFICATE OF CORRECTION

PATENT NO. : 5,526,847
DATED : June 18, 1996
INVENTOR(S) : Macovaz et al.

It is certified that error appears in the above-indentified patent and that said Letters Patent is hereby corrected as shown below:

Title page, item [73], insert the following:
"Assignees: Vinidex Tubemakers Pty. Limited, Australia;
Uponor N.V. The Netherlands Antilles"

Signed and Sealed this

Fifteenth Day of April, 1997

Attest:

BRUCE LEHMAN

Attesting Officer    Commissioner of Patents and Trademarks